United States Patent
Hosotani

(10) Patent No.: US 8,576,584 B2
(45) Date of Patent: Nov. 5, 2013

(54) SWITCHING CONTROL CIRCUIT AND SWITCHING POWER SUPPLY DEVICE

(75) Inventor: Tatsuya Hosotani, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 305 days.

(21) Appl. No.: 13/036,191

(22) Filed: Feb. 28, 2011

(65) Prior Publication Data

US 2011/0211376 A1 Sep. 1, 2011

(30) Foreign Application Priority Data

Mar. 1, 2010 (JP) ................................. 2010-043662

(51) Int. Cl.
*H02M 3/335* (2006.01)

(52) U.S. Cl.
USPC ................. 363/21.05; 363/21.07; 363/21.13; 363/21.15

(58) Field of Classification Search
USPC .............. 363/18, 19, 20, 21.01, 21.02, 21.04, 363/21.07, 21.08, 21.12, 21.15, 21.16, 50
See application file for complete search history.

(56) References Cited

U.S. PATENT DOCUMENTS

| 7,751,209 B2 * | 7/2010 | Shiroyama ................. 363/21.12 |
| 7,826,239 B2 * | 11/2010 | Tepsumran et al. ........ 363/56.09 |
| 2001/0007529 A1 * | 7/2001 | Nishida et al. .................. 363/19 |
| 2005/0248965 A1 * | 11/2005 | Yamada et al. ............ 363/21.08 |
| 2010/0103705 A1 * | 4/2010 | Fang et al. ................. 363/21.18 |

FOREIGN PATENT DOCUMENTS

JP 2008-206271 A 9/2008

* cited by examiner

*Primary Examiner* — Nguyen Tran
(74) *Attorney, Agent, or Firm* — Keating & Bennett, LLP

(57) ABSTRACT

A switching control IC outputs a rectangular wave signal from an output terminal thereof to a driving circuit. A feedback circuit compares a value of a divided voltage of a voltage across output terminals of a switching power supply device with a reference voltage, generates a feedback signal, and inputs the feedback signal into a feedback terminal of the switching control IC. A capacitor and a Zener diode are connected between the feedback terminal and a ground terminal. The Zener diode is selectively connected, and a voltage at the feedback terminal is changed in accordance with the presence of the Zener diode. A voltage at the feedback terminal is detected, and one of a latch method and a hiccup method is selected as a method for an overcurrent protection operation in accordance with the detected voltage.

13 Claims, 4 Drawing Sheets

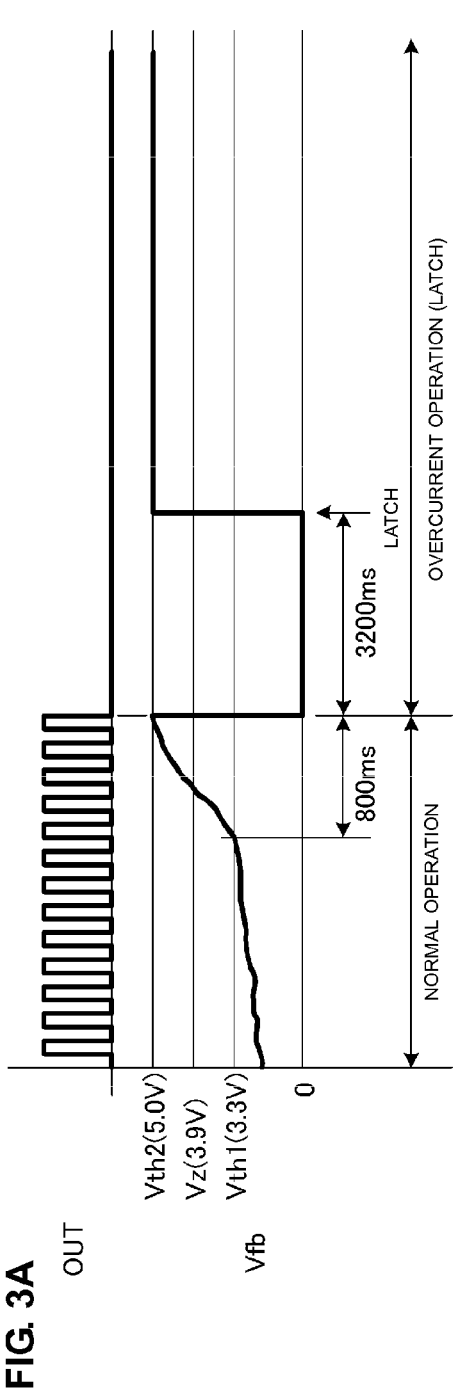
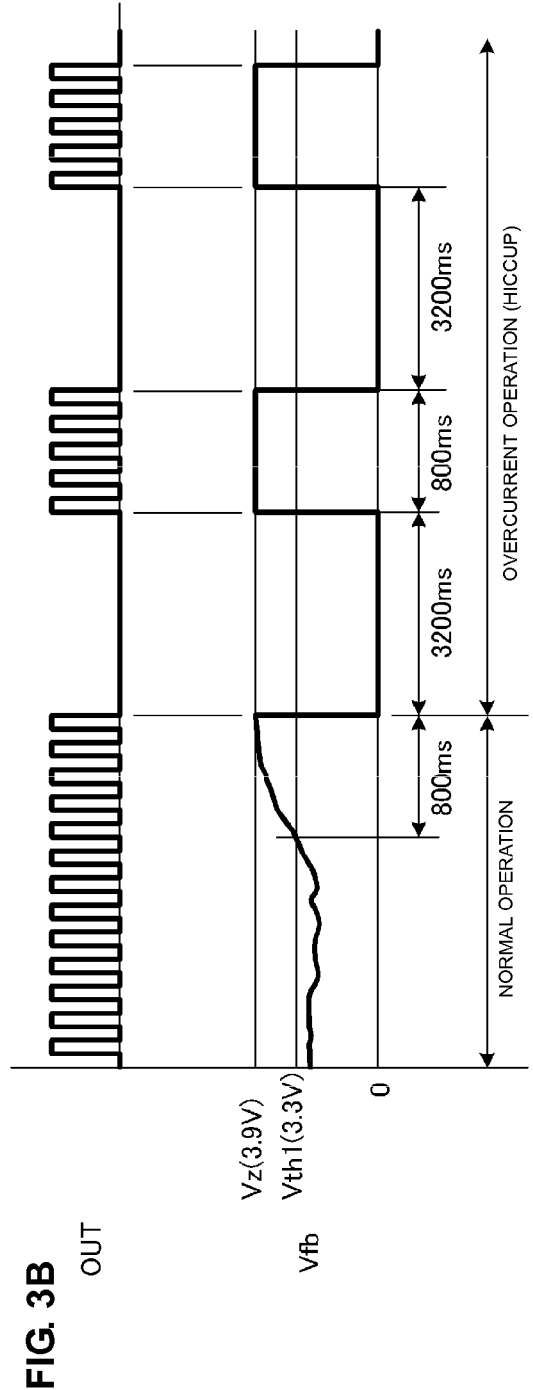

SWITCHING CONTROL CIRCUIT AND SWITCHING POWER SUPPLY DEVICE

BACKGROUND OF THE INVENTION

1. Field of the Invention

The present invention relates to a switching control circuit preferably in the form of an IC for use in a switching power supply device and a switching power supply device including the switching control circuit.

2. Description of the Related Art

In switching power supply devices, a switching control IC includes a circuit for achieving various functions such as an output control function, an activation function, an overcurrent protection function, an overvoltage protection function, a waiting function, and a power factor improvement function. With the increase in the number of functions, the functionality of the switching control IC is increased. For example, upon detecting an overcurrent state, a switching control IC having an overcurrent protection (current control) function holds the non-operational state of a switching operation of a switching element (performs a latch method), or stops the switching operation of the switching element and automatically restarting the switching operation (performs a hiccup method). Accordingly, in accordance with the design of a switching power supply device, one of a switching control IC using a latch method and a switching control IC using a hiccup method is selected for use.

Paragraph [0014] of Japanese Unexamined Patent Application Publication No. 2008-206271 describes a switching control IC using both a latch method and a hiccup method for an overcurrent protection circuit. In the switching control IC using both methods, a single dedicated terminal for selecting one of these methods is provided, and one of these methods is selected in accordance with a signal input into the dedicated terminal or is selected by an external component/circuit.

When a switching control IC using a latch method and a switching control IC using a hiccup method are separately designed and manufactured for use in a switching power supply device having an overcurrent protection function, the number of types of switching control ICs is increased. Not only a manufacturing process but also the management of the ICs is therefore complicated. This leads to the increase in the unit cost of an IC.

For the switching control IC using both a latch method and a hiccup method disclosed in Japanese Unexamined Patent Application Publication No. 2008-206271, a dedicated terminal for selecting one of these methods is required. The number of terminals of the switching control IC is therefore increased. This inhibits the reduction in size of the switching control IC and increases the cost of the switching control IC. That is, the package and unit cost of the switching control IC are increased.

In response to a request for the reduction in the size and footprint of a switching control IC, a switching control IC having a small number of terminals is needed. Accordingly, it is impossible to provide the above-described dedicated terminal.

SUMMARY OF THE INVENTION

Preferred embodiments of the present invention provide a small-sized and low-cost switching control circuit that has a small number of terminals and an overcurrent protection function and a switching power supply device including such a switching control circuit.

A switching control circuit according to a preferred embodiment of the present invention is preferably provided in a power conversion circuit in a switching power supply device and includes a semiconductor integrated circuit to control a switching element. The switching control circuit preferably includes a plurality of external terminals including a feedback signal input terminal to receive a feedback signal that is generated by the power conversion circuit in response to an operation of the switching control circuit, an output voltage stabilization control unit configured to control stabilization of an output voltage in accordance with a signal input into the feedback signal input terminal, and a protected operation mode setting unit configured to detect a voltage induced by an external circuit that is connected to the feedback signal input terminal and that includes a resistor element or a semiconductor element, as a determination target signal, and to set one of a hiccup mode in which an oscillation period and a suspension period are repeated and a latch mode in which oscillation is stopped in accordance with the determination target signal in an overload state or an overvoltage output state.

The determination target signal preferably is, for example, a voltage signal whose voltage range is different from that of the feedback signal. The protected operation mode setting unit sets one of the hiccup mode and the latch mode in accordance with a voltage of the determination target signal.

The switching control circuit preferably also includes, for example, a constant current circuit. The external circuit induces a voltage in accordance with a current from the constant current circuit.

For example, the determination target signal preferably is detected while the power conversion circuit in the switching power supply device is in the overload state.

For example, the determination target signal preferably is detected while an operation of the power conversion circuit in the switching power supply device is stopped.

For example, the determination target signal preferably is detected immediately after the power conversion circuit in the switching power supply device has been started.

For example, a phototransistor in a photocoupler preferably is connected to the feedback signal input terminal, and the photocoupler inputs the feedback signal.

For example, in the overload state, the voltage of the determination target signal is preferably increased with an increase in an impedance of the phototransistor. The protected operation mode setting unit determines whether the voltage of the determination target signal is limited to a predetermined voltage by the resistor element or the semiconductor element connected to the feedback signal input terminal and sets the hiccup mode or the latch mode in accordance with a result of the determination.

The protected operation mode setting unit determines that a current state is the overload state when a period in which the voltage of the determination target signal exceeds a predetermined voltage becomes longer than a predetermined determination period, detects the determination target signal after the predetermined determination period has elapsed, a voltage at the feedback signal input terminal has become approximately 0 V, a switching operation has been stopped, and then a predetermined timer period has elapsed, and sets one of the latch mode and the hiccup mode when the voltage of the determination target signal is higher than a reference voltage set in the switching control circuit and the other one of the latch mode and the hiccup mode when the voltage of the determination target signal is lower than the reference voltage.

The semiconductor element preferably is, for example, a Zener diode, a transistor, or an operational amplifier.

In a switching power supply device according to a preferred embodiment of the present invention, the above-described switching control circuit is preferably included in a power conversion circuit.

Since it is possible to select one of a latch method and a hiccup method without a dedicated terminal according to a preferred embodiment of the present invention, a switching control circuit having an overcurrent protection function can be provided without increasing the number of terminals of a switching control IC.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 3A and 3B are diagrams illustrating waveforms at an output terminal and a feedback terminal of a switching control IC.

DETAILED DESCRIPTION OF THE PREFERRED EMBODIMENTS

Figure 1:
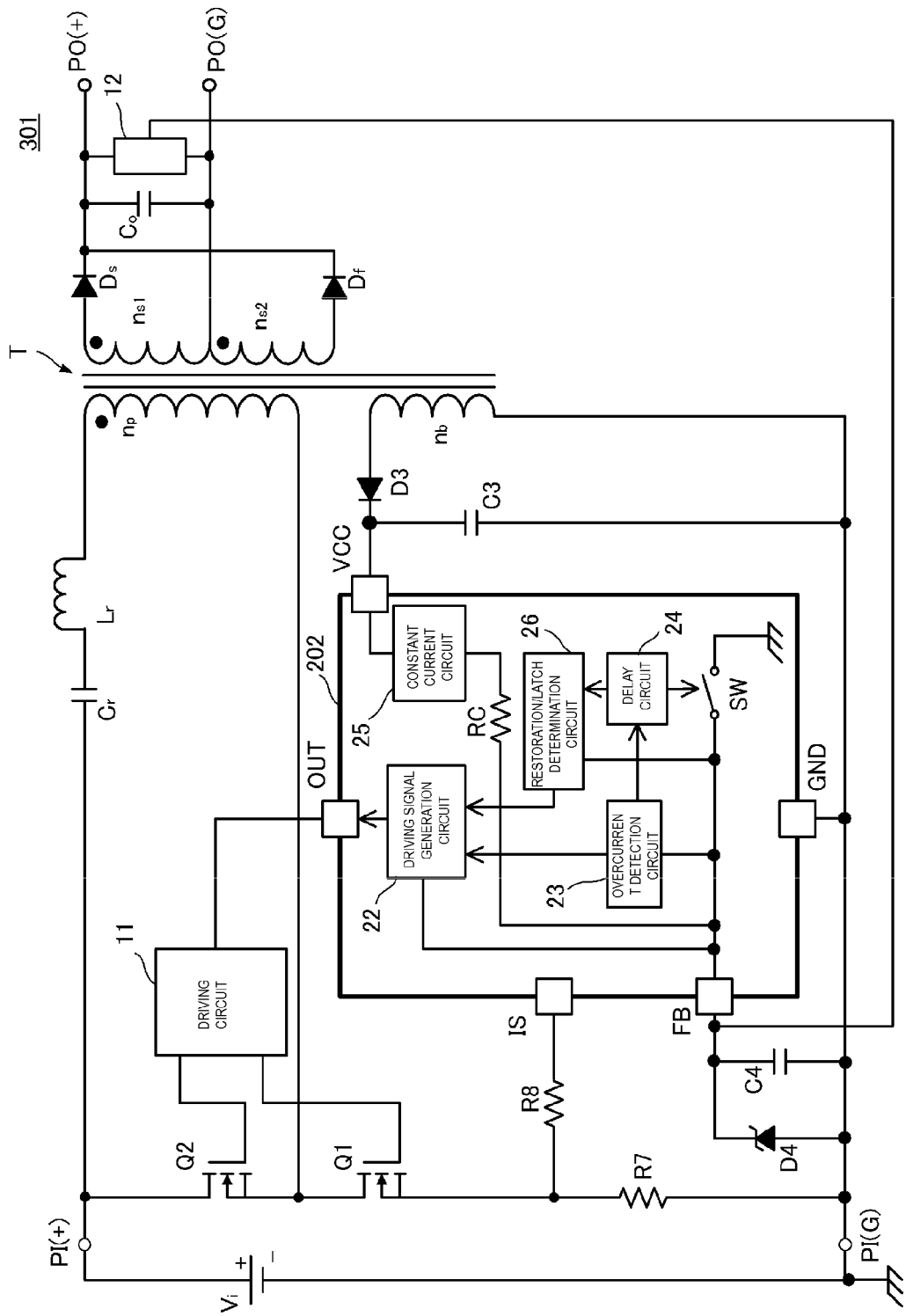
FIG. 1 is a circuit diagram of a switching power supply device according to a preferred embodiment of the present invention.

FIG. 1 is a circuit diagram of a switching power supply device 301 according to a preferred embodiment of the present invention. The switching power supply device 301 includes a switching control IC 202 corresponding to a switching control circuit according to a preferred embodiment of the present invention.

A voltage of a direct-current input power supply Vi is input between input terminals PI(+) and PI(G) of the switching power supply device 301. A predetermined direct-current voltage is output to a load connected between output terminals PO(+) and PO(G) of the switching power supply device 301.

A first series circuit including a capacitor Cr, an inductor Lr, a primary winding np of a transistor T, a first switching element Q1, and a current detection resistor R7 connected in series is located between the input terminals PI(+) and PI(G). The first switching element Q1 preferably is an FET. A drain terminal of the first switching element Q1 is connected to the primary winding np of the transistor T, and a source terminal of the first switching element Q1 is connected to the current detection resistor R7.

A second switching element Q2 preferably is an FET. A drain terminal of the second switching element Q2 is connected to the input terminal PI(+), and a source terminal of the second switching element Q2 is connected to the drain terminal of the first switching element Q1.

A first rectifying and smoothing circuit including diodes Ds and Df and a capacitor Co is connected to secondary windings ns1 and ns2 of the transistor T. The first rectifying and smoothing circuit performs full-wave rectification upon an alternating voltage output from the secondary windings ns1 and ns2 and outputs the alternating voltage to the output terminals PO(+) and PO(G).

A rectifying and smoothing circuit including a diode D3 and a capacitor C3 is connected to a first driving winding nb of the transistor T. A direct-current voltage obtained by this rectifying and smoothing circuit is supplied between terminals GND and VCC of the switching control IC 202 as a power supply voltage. In the switching power supply device 301, a circuit excluding the switching control IC 202 is a power conversion circuit.

The switching control IC 202 outputs a rectangular wave signal from a terminal OUT thereof to a driving circuit 11. The driving circuit 11 controls the first switching element Q1 and the second switching element Q2 so that they are alternately turned on or off. At that time, in order not to turn on the first switching element Q1 and the second switching element Q2 at the same time, a dead time period is set.

A resistor R8 is connected to a current detection terminal IS of the switching control IC 202 so that the falling voltage of the current detection resistor R7 is input into the switching control IC 202.

A feedback circuit 12 is disposed between the switching control IC 202 and each of the output terminals PO(+) and PO(G). The feedback circuit 12 compares the value of a divided voltage of a voltage across the output terminals PO(+) and PO(G) with a reference voltage, generates a feedback signal, and inputs a feedback voltage into a feedback terminal FB of the switching control IC 202 in an insulating state.

A capacitor C4 and a Zener diode D4 are connected between the feedback terminal FB and the ground terminal GND. The Zener diode D4 is an external circuit that is selectively connected.

Figure 2:
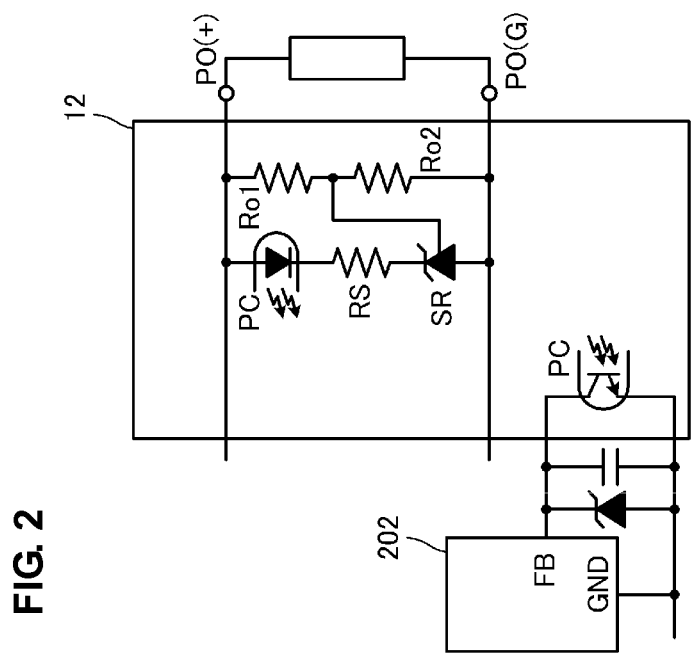
FIG. 2 is a circuit diagram of a feedback circuit illustrated in FIG. 1.

FIG. 2 is a circuit diagram of the feedback circuit 12. A series circuit including a shunt regulator SR, a resistor Rs, and a light-emitting element in a photocoupler PC and a voltage dividing circuit including resistors Ro1 and Ro2 are connected between the output terminals PO(+) and PO(G). A phototransistor that is a light-receiving element in the photocoupler PC is connected between the feedback terminal FB and the ground terminal GND of the switching control IC 202. In the switching control IC 202, a constant current circuit is connected to the feedback terminal FB.

The feedback circuit 12 operates so that a voltage at the feedback terminal FB is reduced when a voltage output to each of the output terminals PO(+) and PO(G) is higher than a predetermined voltage.

FIGS. 3A and 3B are diagrams illustrating waveforms at the output terminal OUT and the feedback terminal FB of the switching control IC. The internal configuration and operation of the switching control IC 202 illustrated in FIG. 1 will be described with reference to FIGS. 1, 3A and 3B. A driving signal generation circuit 22 turns on/off the first switching element Q1 and the second switching element Q2 via the driving circuit 11 at a predetermined switching frequency. As a result, the switching power supply device 301 operates as a current resonant converter.

At the time of normal operation, a voltage fed back from the feedback circuit 12 does not exceed a Zener voltage of the Zener diode D4. Accordingly, at the time of the normal operation, the driving signal generation circuit 22 detects an output voltage with a signal input into the feedback terminal FB, and controls the frequency of a rectangular wave signal to be output to the output terminal OUT so that the output voltage becomes constant. As a result, a voltage output from the switching power supply device 301 is stabilized.

When a period in which the voltage at the feedback terminal FB exceeds a predetermined voltage becomes longer than a predetermined period, an overcurrent detection circuit 23 determines that a current state is an overcurrent operational state (overload state). In this preferred embodiment, the predetermined period is preferably set to approximately 800 milliseconds (ms), and the predetermined voltage is preferably set to approximately 3.3 V, for example. In addition, as will be described later, the values of approximately 3200 milliseconds (ms), approximately 50 microseconds (µs), and approximately 5 V, for example, are preferably set in this preferred embodiment. In the overcurrent operational state, the impedance of the phototransistor illustrated in FIG. 2 is increased. After approximately 800 milliseconds (ms) have elapsed, a delay circuit 24 turns on a switch SW in the switching control IC 202 and sets the voltage at the feedback terminal FB to approximately 0 V. Subsequently, the driving signal generation circuit 22 stops switching operations of the first switching element Q1 and the second switching element Q2.

Thus, the detection of the voltage at the feedback terminal FB is performed in periods in which the power conversion circuit in the switching power supply device is in the overload state and a non-operational state.

Subsequently, after approximately 3200 milliseconds (ms) have elapsed, the delay circuit 24 turns off the switch SW and releases the voltage at the feedback terminal FB clamped to approximately 0 V. Since the constant current circuit 25 is connected to the feedback terminal FB via a resistor Rc, the voltage at the capacitor C4 rises to the voltage at the power supply voltage terminal VCC, approximately 5.3 V, and the voltage at the feedback terminal FB exceeds approximately 5 V when the Zener diode D4 is not connected to the feedback terminal FB. On the other hand, when the Zener diode D4 having, for example, the Zener voltage of approximately 3.9 V, is connected to the feedback terminal FB, the voltage at the feedback terminal FB does not exceed approximately 3.9 V.

A restoration/latch determination circuit 26 detects the voltage at the feedback terminal FB after approximately 50 microseconds (µs) have elapsed since the switch SW was turned off, and stops the operation of the driving signal generation circuit 22 when the detected voltage is higher than the reference voltage of approximately 5 V. That is, the restoration/latch determination circuit 26 performs a latch operation while stopping a switching operation. On the other hand, when the detected voltage is lower than the reference voltage of approximately 5 V, the driving signal generation circuit 22 is operated and is automatically restored to the switching operation state.

Thus, a latch operation is performed when the Zener diode D4 is not connected to the feedback terminal FB, and an automatic restoration mode is set when the Zener diode D4 is connected to the feedback terminal FB.

For example, it is possible to switch between an automatic restoration method and a latch method by detecting the voltage at the feedback terminal FB and setting one of the following operational states in accordance with the detected voltage.

Approximately 0.4 V≤the voltage at the feedback terminal FB<approximately 3.3 V: the range in which a control operation is performed with a feedback voltage Approximately 3.3 V≤the voltage at the feedback terminal FB<approximately 5.0 V: the range in which an overcurrent protection operation is performed (with a hiccup method (automatic restoration method))

The voltage at the feedback terminal FB≥approximately 5.0 V: the range in which an overcurrent protection operation is performed (with a latch method)

Thus, it is unnecessary to dispose switching control ICs for two methods, a latch method and an automatic restoration method so as to achieve an overcurrent protection function in the switching power supply device 301. Accordingly, the reduction in inventory, the standardization of components, and cost reduction can be achieved.

Furthermore, since it is unnecessary to dispose an IC terminal to switch between the latch method and the automatic restoration method, the reduction in the size of an IC can be achieved. By effectively using the terminals of an IC, the functionality of the IC can be increased.

Only by connecting a Zener diode to a terminal of an IC as a peripheral circuit, it is possible to switch between the latch method and the automatic restoration method. An adverse effect on the normal operation of an IC is not produced.

By combining the functions of a terminal of an IC, the functions of the terminal can be hidden and the imitation of the IC can be prevented.

In the above-described example, a voltage clamp circuit defined by a Zener diode is connected to a feedback signal input terminal as an external circuit. However, instead of the Zener diode, a resistor, a transistor, or an operational amplifier may be used as the external circuit.

Figure 4:
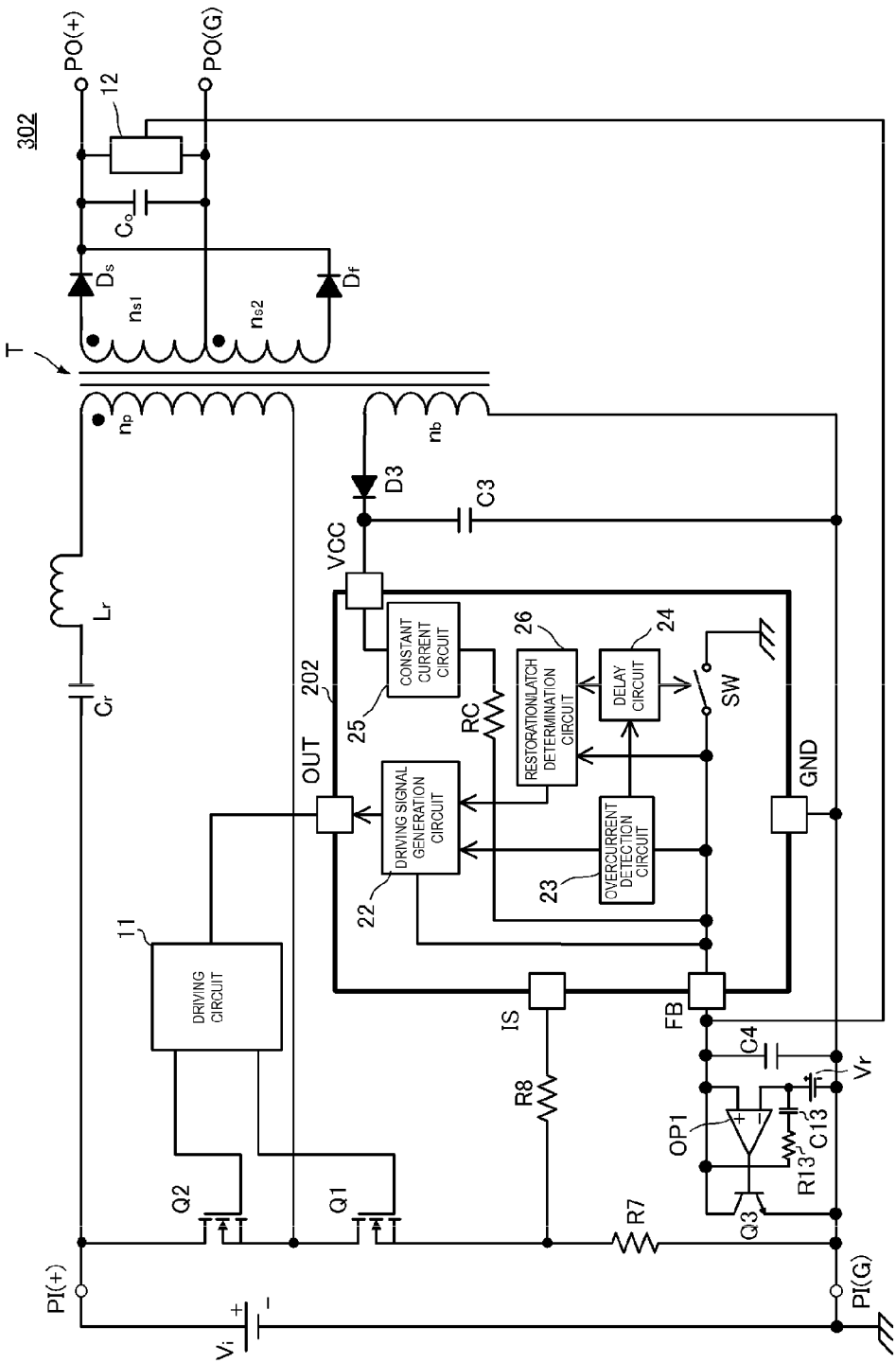
FIG. 4 is a diagram illustrating an example of another external circuit externally connected to the feedback terminal.

FIG. 4 is a diagram illustrating an example of another external circuit externally connected to the feedback terminal FB. Referring to FIG. 4, an external circuit including an operational amplifier OP1, a reference voltage generation circuit Vr, a resistor R13, a capacitor C13, and a transistor Q3 is connected to the feedback terminal FB. The operational amplifier OP1, the reference voltage generation circuit Vr, and the transistor Q3 operate as a constant voltage circuit. The resistor R13 and the capacitor C13 operate as a filter circuit to prevent a malfunction caused by a noise component superimposed on the voltage at the feedback terminal FB. Thus, active elements such as an operational amplifier and a transistor may be included in the external circuit.

The voltage at the feedback terminal FB may be detected not only after the switching operations of the first switching element Q1 and the second switching element Q2 have been stopped but also immediately after a switching control circuit has been started, and one of the automatic restoration method and the latch method may be selected in accordance with the detected voltage.

The hiccup mode may be set when the voltage at the feedback terminal FB is higher than a reference voltage, and the latch mode may be set when the voltage at the feedback terminal FB is lower than the reference voltage.

A preferred embodiment of the present invention may be applied not only to a case in which one of the automatic restoration method and the latch method is selected at the time of an overcurrent operation but also to a case in which one of the automatic restoration method and the latch method is selected at the time of an overvoltage operation.

The converter type of a switching power supply device according to a preferred embodiment of the present invention is not limited to a resonant converter type, and may be a rectangular wave converter type. The converter type of a switching power supply device according to a preferred embodiment of the present invention is not limited to an isolated converter type, and may be a non-isolated converter type. The converter type of a switching power supply device according to a preferred embodiment of the present invention is not limited to a half-bridge converter type, and may be a forward converter type, a flyback converter type, or a full-bridge converter type, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A switching control circuit for use in a power conversion circuit in a switching power supply device and includes a semiconductor integrated circuit to control a switching element, the switching control circuit comprising:
   a plurality of external terminals including a feedback signal input terminal arranged to receive a feedback signal that is generated by the power conversion circuit in response to an operation of the switching control circuit;
   an output voltage stabilization control unit configured to control stabilization of an output voltage in accordance with a signal input into the feedback signal input terminal; and
   a protected operation mode setting unit configured to detect a voltage induced by an external circuit that is connected to the feedback signal input terminal and that includes a resistor element or a semiconductor element, as a determination target signal, and to set one of a hiccup mode in which an oscillation period and a suspension period are repeated and a latch mode in which oscillation is stopped in accordance with the determination target signal in an overload state or an overvoltage output state; wherein
   the feedback signal input terminal is defined by a single one of the plurality of external terminals; and
   the feedback signal input terminal is arranged to control the output voltage stabilization control unit so as to control stabilization of the output voltage and to control the protected operation mode setting unit so as to select one of the hiccup mode and the latch mode.

2. The switching control circuit according to claim 1, wherein the determination target signal is a voltage signal whose voltage range is different from that of the feedback signal, and
   the protected operation mode setting unit sets one of the hiccup mode and the latch mode in accordance with a voltage of the determination target signal.

3. The switching control circuit according to claim 1, further comprising a constant current circuit, wherein the external circuit induces a voltage determined in accordance with a current from the constant current circuit.

4. The switching control circuit according to claim 1, wherein the determination target signal is detected while the power conversion circuit in the switching power supply device is in the overload state.

5. The switching control circuit according to claim 1, wherein the determination target signal is detected while an operation of the power conversion circuit in the switching power supply device is stopped.

6. The switching control circuit according to claim 1, wherein the determination target signal is detected immediately after the power conversion circuit in the switching power supply device has been started.

7. The switching control circuit according to claim 1, wherein a phototransistor in a photocoupler is connected to the feedback signal input terminal, and the photocoupler inputs the feedback signal.

8. The switching control circuit according to claim 7, wherein, in the overload state, the voltage of the determination target signal is increased with an increase in an impedance of the phototransistor, and the protected operation mode setting unit determines whether the voltage of the determination target signal is limited to a predetermined voltage by the resistor element or the semiconductor element connected to the feedback signal input terminal and sets the hiccup mode or the latch mode in accordance with a result of the determination.

9. The switching control circuit according to claim 1, wherein the protected operation mode setting unit determines that a current state is the overload state when a period in which the voltage of the determination target signal exceeds a predetermined voltage becomes longer than a predetermined determination period, detects the determination target signal after the predetermined determination period has elapsed, a voltage at the feedback signal input terminal has become approximately 0 V, a switching operation has been stopped, and then a predetermined timer period has elapsed, and sets one of the latch mode and the hiccup mode when the voltage of the determination target signal is higher than a reference voltage set in the switching control circuit and the other one of the latch mode and the hiccup mode when the voltage of the determination target signal is lower than the reference voltage.

10. The switching control circuit according to claim 1, wherein the semiconductor element is a Zener diode.

11. The switching control circuit according to claim 1, wherein the semiconductor element is a transistor.

12. The switching control circuit according to claim 1, wherein the semiconductor element is an operational amplifier.

13. A switching power supply device in which the switching control circuit according to claim 1 is included in a power conversion circuit.

* * * * *